C. H. STEYER.
TANK HEATER.
APPLICATION FILED MAR. 1, 1912.

1,035,259. Patented Aug. 13, 1912.

Witnesses
J. Milton Jester
B. F. Hitchborne

Inventor
Carl H. Steyer
By C. L. Parker
Attorney

UNITED STATES PATENT OFFICE.

CARL H. STEYER, OF MOUNT HOREB, WISCONSIN.

TANK-HEATER.

1,035,259.  Specification of Letters Patent.  Patented Aug. 13, 1912.

Application filed March 1, 1912. Serial No. 680,924.

*To all whom it may concern:*

Be it known that I, CARL H. STEYER, a citizen of the United States, residing at Mount Horeb, in the county of Dane and State of Wisconsin, have invented certain new and useful Improvements in Tank-Heaters, of which the following is a specification.

The present invention relates to a heater to be placed in a tank containing the water to be heated.

An important object of this invention is to provide means of the above mentioned character, so constructed that the maximum amount of heat generated in the same is utilized to raise the temperature of the water, thus effecting a great saving in the cost of heating the water.

A further object of my invention is to provide a heater of the above mentioned character, having a very large heat radiating surface, which is engaged by the water.

A further object of this invention is to provide novel means to cause the heated gases or products of combustion to circulate horizontally through the shell of the heater, whereby the sides or walls of such shell will absorb the heat from such gases before they are finally discharged from the device.

A further object of my invention is to provide a tank heater of the above mentioned character, which is simple in construction, cheap to manufacture, easy to operate, and formed of few and simple parts, which may be readily separated and assembled.

Other objects and advantages of the present invention will be apparent during the course of the following description.

Figure 1:
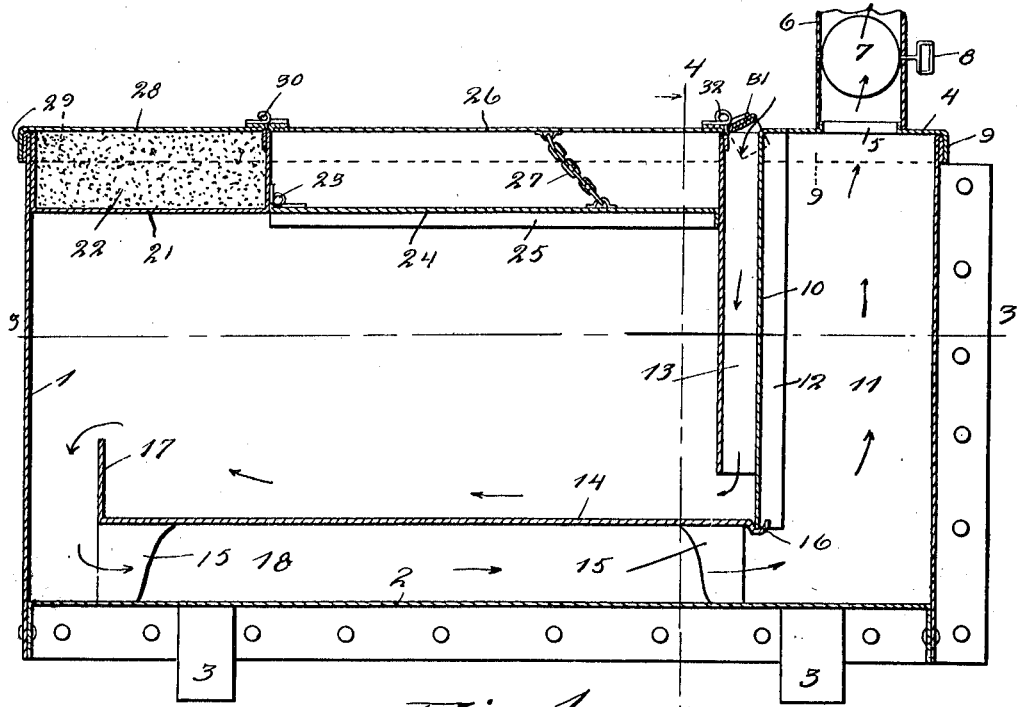
Figure 2:
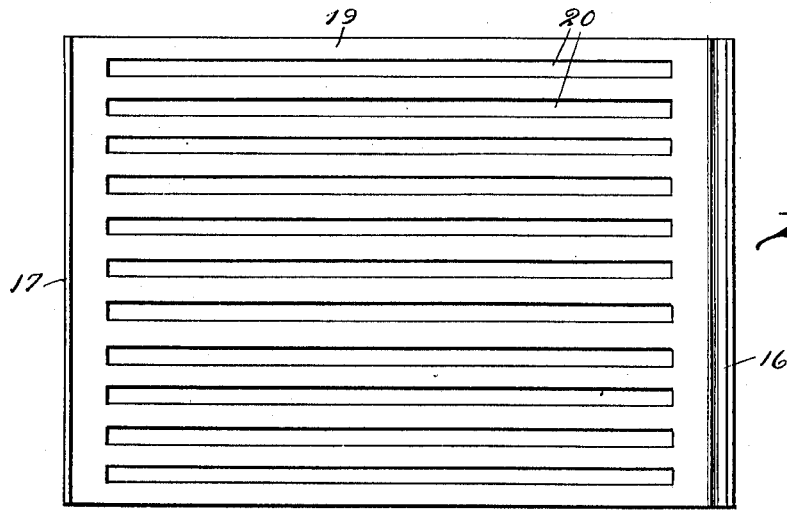

In the accompanying drawings forming a part of this specification and in which like numerals are employed to designate like parts throughout the same, Figure 1 is a central vertical sectional view through the heater, and Fig. 2 is a plan view of a coal-grate.

In the drawings wherein for the purpose of illustration, I have shown a preferred embodiment of my invention, the numeral 1 designates the outer shell or casing of the heater, which may preferably be formed of galvanized sheet-metal, although any other suitable material may be employed. This outer shell or casing is preferably rectangular and is horizontally arranged, as shown.

The shell or casing 1 has its lower end closed by a bottom 2, to which are secured legs 3, for supporting the heater in spaced relation from the bottom of a tank (not shown) within which the same is placed.

Removably mounted upon the upper forward end of the shell 1 is a cap 4, having a central opening 5, which discharges into a stack 6. Within this stack is disposed a pivoted damper 7, to be turned by an element 8. The cap 4 is provided with a depending flange 9, which engages the side and end walls of the shell or casing 1. Depending from one side of the cap 4 is a partition plate or wall 10, vertically disposed and spaced from the forward end wall of the shell 1, for providing a discharge flue 11, which conducts the products of combustion or heated gases to the stack 6. The partition wall 10 is provided upon its vertical edges with flanges 12, as shown. Rigidly connected with the rear side of the partition wall 10 is a part 13 forming with the partition wall 10 an air inlet or conduit, having both ends formed open, as shown. The lower end of this air inlet terminates near and spaced from the lower end of the partition wall 10.

Disposed within the shell 1 is a horizontal fuel support or plate 14, provided upon its longitudinal edges with depending legs or supports 15, which retain this plate in spaced relation from the bottom 2. The support or plate 14 has its material at the forward end thereof bent or crimped to form a socket 16, to receive the lower end of the partition plate 10. At its opposite end the support or plate 14 is provided with an upstanding deflector or flange 17, as shown. It is thus seen that below the fuel support 14, is formed a horizontal gas passage 18, which communicates with the lower end of the gas passage or flue 11. The passages 18 and 11 form in effect an L-shaped gas passage. The fuel support 14 is used when wood is burned in the device. When it is desired to use coal as a fuel, I employ a grate 19, shown in Fig. 2. This grate is just like the fuel support 14 except that it is provided with longitudinal openings 20.

It is desired to prevent the escape or radiation of the heat from the top or upper portion of the shell 1. With this end in view I provide at the upper rear portion of the shell 1 a box 21, fixedly held in place by any suitable means. This box is filled with sand 22 or other poor heat conducting material. Pivotally connected with the forward lower portion of the box 21, as shown at 23, is a horizontal swinging door 24, provided with a depending flange 25. The forward end of this door slidably engages the wall of the air inlet 13. Disposed above the door 24 is a cover or door 26, the two being connected by a chain 27 or other flexible element. The sand box 21 is normally closed by a cover 28 having a depending flange 29 which fits about the side and end walls of the shell 1. The covers 26 and 28 have their adjacent ends pivotally connected by means of hinges 30. Suitable means (not shown) may be employed to rigidly hold the cover 28 in place upon the shell 1, so that it will serve as a fixed support for the cover 26. Such means should be detachable so that the cover 28 may be raised to allow access to the sand box 21.

The numeral 31 designates a vertically swinging valve or damper to control the passage of air into the inlet 13. This valve or damper is pivotally connected to the forward end of the lid or door 26 by means of hinges 32, as shown.

The operation of the device is as follows: A suitable tank (not shown) containing the water to be heated is provided, within which is placed my device. The water level of course is about to the door 24. The fuel is put upon the support 14 and the fire kindled. Air is supplied into the upper end of the inlet 13 and passes downwardly through the same to be discharged from the lower end thereof. This air now passes horizontally over the fire and then about the deflector 7 and subsequently horizontally through the flue 18 below the support 14. The heated gases and products of combustion passing through the flue 18 discharge into the lower end of the vertical flue 11 and pass from the upper end of the same into the stack 6. The supply of air into the inlet 13 and the discharge of gases from the stack 6 may be regulated by manipulation of the valves or dampers 31 and 7 respectively. It is thus seen that the heated gases are made to circulate horizontally through the shell 1 for its entire length in two directions, whereby such gases will impart the greater amount of their heat to the walls of the shell 1. The covers 24 and 26 provide an air space therebetween which prevents to a considerable degree the radiation of heat from the top or upper portion of the device. The sand box 21 serves the same purpose. The partition plate 10 and fuel support 14 are readily removable for the purpose of repair or cleaning.

It is to be understood that the form of my invention herewith shown and described is to be taken as a preferred example of the same and that certain changes in the shape, size, and arrangement of parts may be resorted to without departing from the spirit of the invention or the scope of the subjoined claims.

Having thus described my invention, I claim:—

1. A heater of the character described, comprising an outer oblong shell to be horizontally submerged in a tank or the like of water, a horizontal fuel support disposed within the shell and placed near and spaced from the bottom and ends thereof, a cap mounted upon the upper portion of the shell at one end thereof, a depending transverse partition plate connected with the cap and engaging one end of the horizontal fuel support and forming with one end wall of the outer shell an upstanding discharge passage for the products of combustion, having communication with the space formed between the horizontal fuel support and the bottom of the outer shell, and a part mounted upon the opposite side of said transverse partition plate for forming with the same an air supply conduit discharging at its lower end near one end of the horizontal fuel support.

2. In a heater of the character described, an outer oblong shell to be submerged horizontally at a desired depth into a tank or the like of water, a movable door for closing the portion of the top of said shell, a horizontal fuel support disposed within the shell and placed near and spaced from the bottom and ends thereof, a cap mounted upon the top of the shell and disposed near one end of the movable door, a depending transverse partition plate formed integral with the cap and engaging at its lower end one end of the horizontal fuel support, thus forming upon one side thereof with the end wall of said shell a discharge passage for products of combustion, having communication with the space formed between the horizontal fuel support and the bottom of the outer shell, a part mounted upon the opposite side of said transverse partition plate and forming therewith an air inlet conduit having its lower discharge end at one end of the fuel support, and a valved stack connected with said cap.

3. A heater of the character described, comprising an oblong shell to be horizontally submerged a proper depth in a tank or the like of water, a removable horizontal fuel support having depending legs at its corners which hold it in spaced relation from the bottom of said shell, the horizontal fuel support being much shorter than the shell so that its ends are spaced from the end walls of the shell, a removable cap mounted upon the top of the shell at one end thereof, said horizontal fuel support being provided at one end with a socket, a depending transverse partition plate formed integral with the cap and having its lower end fitting snugly within the socket of the fuel support for forming a detachable connection therewith, said transverse partition plate forming upon one side thereof with the end wall of the shell a discharge passage for the products of combustion having free communication with one end of a passage formed below the fuel support, a sheet-metal part mounted upon the opposite side of the transverse partition plate and forming therewith an air inlet conduit having its lower discharge end disposed adjacent the forward end of the horizontal fuel support, an upstanding flange formed upon the opposite end of the fuel support and forming a restricted passage establishing communication between the spaces above and below the horizontal fuel support, and a movable cover to normally close an opening in the top of the shell.

4. A heater of the character described, comprising an outer shell, a fuel support disposed therein and held in spaced relation from the bottom wall of the shell, an upstanding partition plate disposed near one end portion of the fuel support, and an air inlet conduit discharging into the shell near the partition plate and above said fuel support.

5. A heater of the character described, comprising an outer shell, a horizontal fuel support disposed therein and having one end of its material bent in the form of a socket, a cap engaging the upper portion of the shell, a depending partition plate connected with such cap and having its lower end fitting within the socket, and an air inlet conduit formed upon one side of the partition plate.

6. A heater of the character described, comprising an outer shell, a horizontal fuel support disposed therein and having one end provided with an upstanding flange and the opposite end with a socket, a cap disposed upon the upper portion of the shell, a depending partition plate formed upon the cap and having its lower end fitting in the socket, a stack connected with said cap, a damper disposed within the stack, an air inlet conduit formed upon one side of the partition plate, a swinging lid to close the upper portion of the shell, and a damper pivotally connected with the lid to control the passage of air into said air inlet conduit.

In testimony whereof I affix my signature in presence of two witnesses.

CARL H. STEYER.

Witnesses:
HENRY STEYER,
HERMAN EGGUM.